(12) United States Patent
Viswanathan

(10) Patent No.: US 7,377,109 B2
(45) Date of Patent: May 27, 2008

(54) APPARATUS AND METHOD FOR REDUCTION OF JET NOISE FROM TURBOFAN ENGINES HAVING SEPARATE BYPASS AND CORE FLOWS

(75) Inventor: Krishnamurthy Viswanathan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 677 days.

(21) Appl. No.: 10/822,351

(22) Filed: Apr. 9, 2004

(65) Prior Publication Data

US 2005/0223692 A1  Oct. 13, 2005

(51) Int. Cl.
 *F02K 1/00* (2006.01)
(52) U.S. Cl. ..................... 60/770; 60/226.1
(58) Field of Classification Search ............. 60/226.1, 60/262, 263, 770
 See application file for complete search history.

(56) References Cited

U.S. PATENT DOCUMENTS

| | | | |
|---|---|---|---|
| 3,215,172 A | | 11/1965 | Ardoin |
| 3,393,518 A | * | 7/1968 | Bridge ..................... 60/770 |
| 3,590,943 A | | 7/1971 | Millman |
| 3,625,432 A | * | 12/1971 | Bragg ................ 239/265.35 |
| 3,648,800 A | | 3/1972 | Hoerst |
| 3,655,008 A | | 4/1972 | Millman |
| 3,844,375 A | | 10/1974 | Manca et al. |
| 4,214,703 A | | 7/1980 | Sorensen et al. |
| 4,288,984 A | * | 9/1981 | Bhat et al. ................. 60/262 |
| 4,817,379 A | * | 4/1989 | Bagley ........................ 60/761 |
| 5,450,720 A | | 9/1995 | Vuillamy et al. |
| 5,692,372 A | * | 12/1997 | Whurr ....................... 60/226.1 |
| 5,924,632 A | * | 7/1999 | Seiner et al. ......... 239/265.19 |
| 6,070,407 A | * | 6/2000 | Newton .................... 60/226.1 |
| 6,082,635 A | | 7/2000 | Seiner et al. |

(Continued)

FOREIGN PATENT DOCUMENTS

EP   1 104 847   6/2001

OTHER PUBLICATIONS

Viswanathan, K., "Analysis of the Two Similarity Components of Turbulent Mixing Noise", AIAA Journal, vol. 40, No. 9, Sep. 2002, pp. 1735-1744.

(Continued)

*Primary Examiner*—William H. Rodríguez
(74) *Attorney, Agent, or Firm*—Harness, Dickey & Pierce, P.L.C.

(57) ABSTRACT

An exhaust flow system for use with a turbofan jet engine that provides separate fan flow and core flow streams that are not mixed. The system includes a fan nozzle and a primary flow nozzle. The primary flow nozzle includes a downstream edge portion that is either beveled with one or more beveled surfaces, or that contains a curving edge surface or a combination of a beveled edge and a curved edge to help direct noise generated by the jet engine upwardly away from a ground surface during take-off and landing procedures. The primary exhaust nozzle can also be orientated with an elongated lip portion thereof formed by the beveled edge surface such that the lip potion is orientated between a top dead center and a bottom dead center position, to thus help direct noise away from a cabin area of a fuselage of a mobile platform during cruise conditions.

12 Claims, 13 Drawing Sheets

U.S. PATENT DOCUMENTS

| | | |
|---|---|---|
| 6,260,352 B1 * | 7/2001 | Negulescu et al. ............ 60/262 |
| 6,308,898 B1 * | 10/2001 | Dorris et al. .......... 239/265.17 |
| 6,314,721 B1 * | 11/2001 | Mathews et al. ............. 60/264 |
| 6,318,070 B1 * | 11/2001 | Rey et al. ................... 60/226.3 |
| 6,360,528 B1 | 3/2002 | Brausch et al. |
| 6,415,598 B2 * | 7/2002 | Pinker ....................... 60/226.1 |
| 6,532,729 B2 | 3/2003 | Martens |
| 6,612,106 B2 | 9/2003 | Balzerr |
| 6,640,537 B2 | 11/2003 | Tse |
| 6,658,839 B2 | 12/2003 | Hebert |
| 6,969,028 B2 * | 11/2005 | Dun ............................ 244/54 |
| 7,000,378 B2 * | 2/2006 | Birch et al. ................ 60/226.1 |
| 7,174,718 B2 * | 2/2007 | Bonnet et al. ................ 60/770 |
| 2002/0073691 A1 * | 6/2002 | Rey et al. ................... 60/226.1 |
| 2002/0121090 A1 * | 9/2002 | Zysman et al. ................ 60/770 |
| 2002/0125340 A1 * | 9/2002 | Birch et al. ............ 239/265.11 |
| 2005/0060982 A1 * | 3/2005 | Mani et al. ................. 60/226.1 |
| 2005/0223691 A1 * | 10/2005 | Viswanathan ................ 60/204 |

OTHER PUBLICATIONS

Viswanathan, K., "Parametric Study of Noise From Dual-Stream Nozzles", AIAA 2003-1198, Jan. 2003, pp. 1-11.

Viswanathan, K., "Aeroacoustics of Hot Jets", AIAA 2002-2481, Jun. 2002, pp. 1-11.

Viswanathan, K., "Jet Aeroacoustic Testing: Issues and Implications", AIAA Journal, vol. 41, No. 9, Sep. 2003, pp. 1674-1689.

Viswanathan, K. and Clark, L.T., "Effect of Nozzle Internal Contour on Jet Aeroacoustics", AIAA 2004-8, Jan. 2004, pp. 1-11.

* cited by examiner

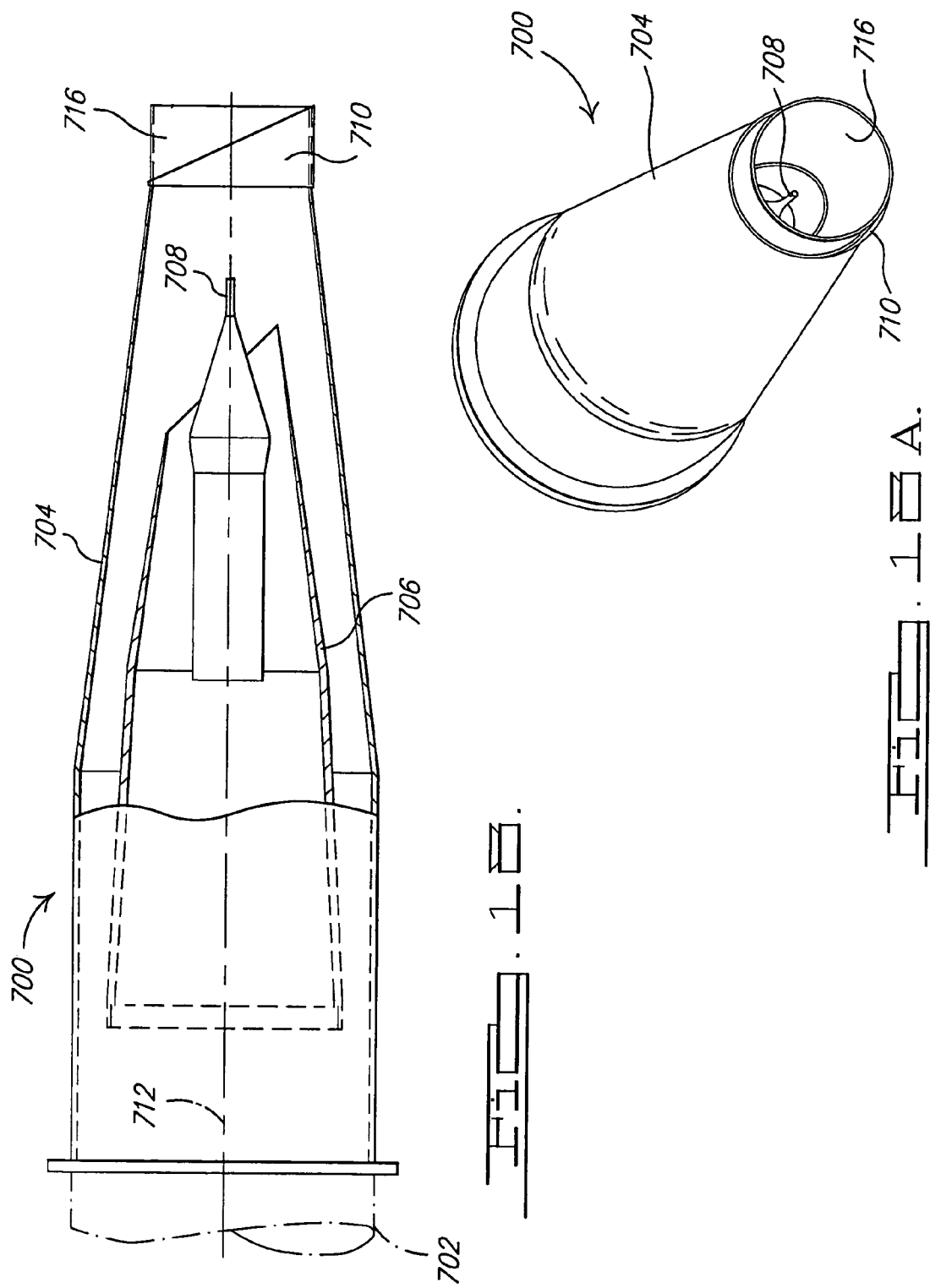

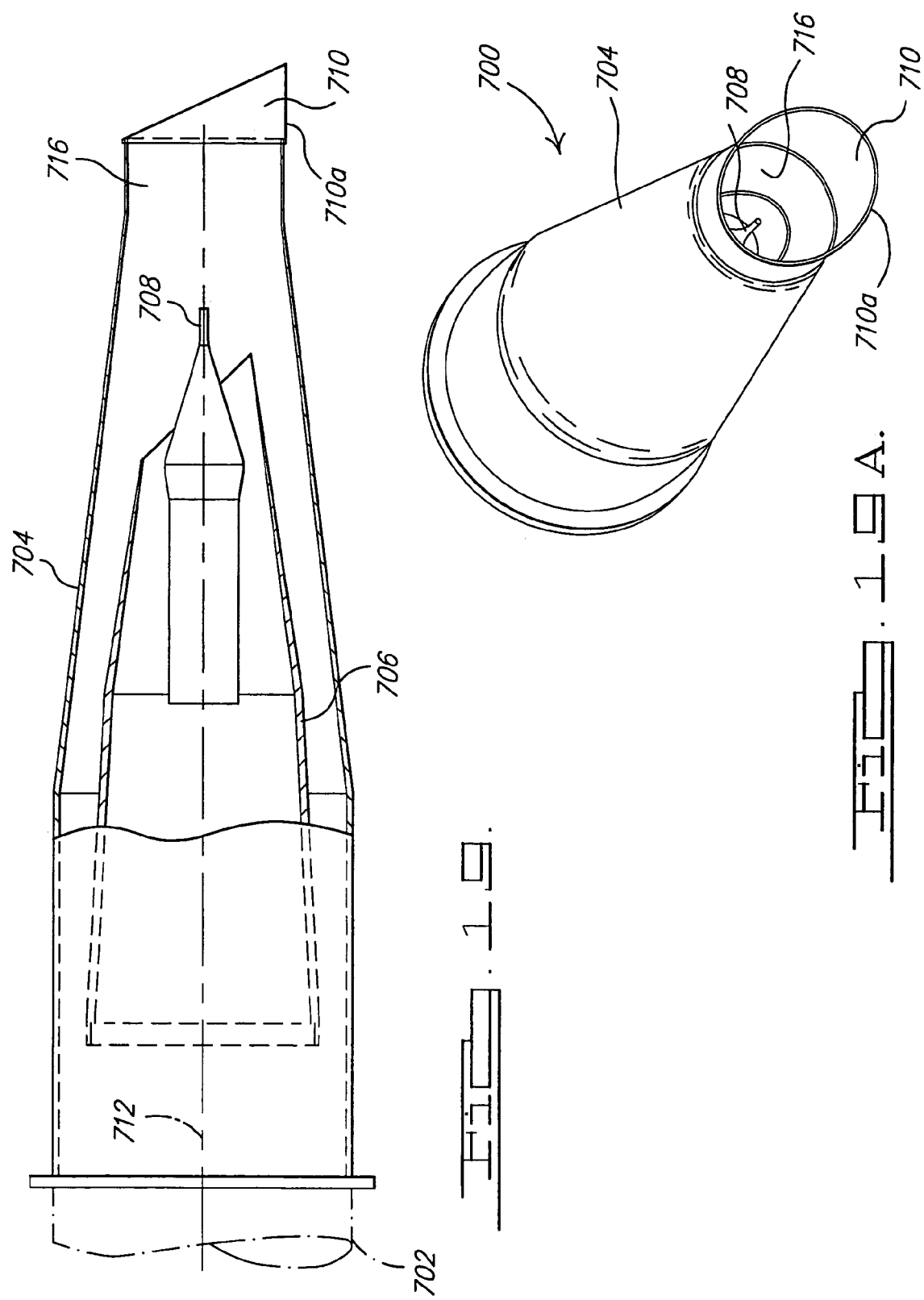

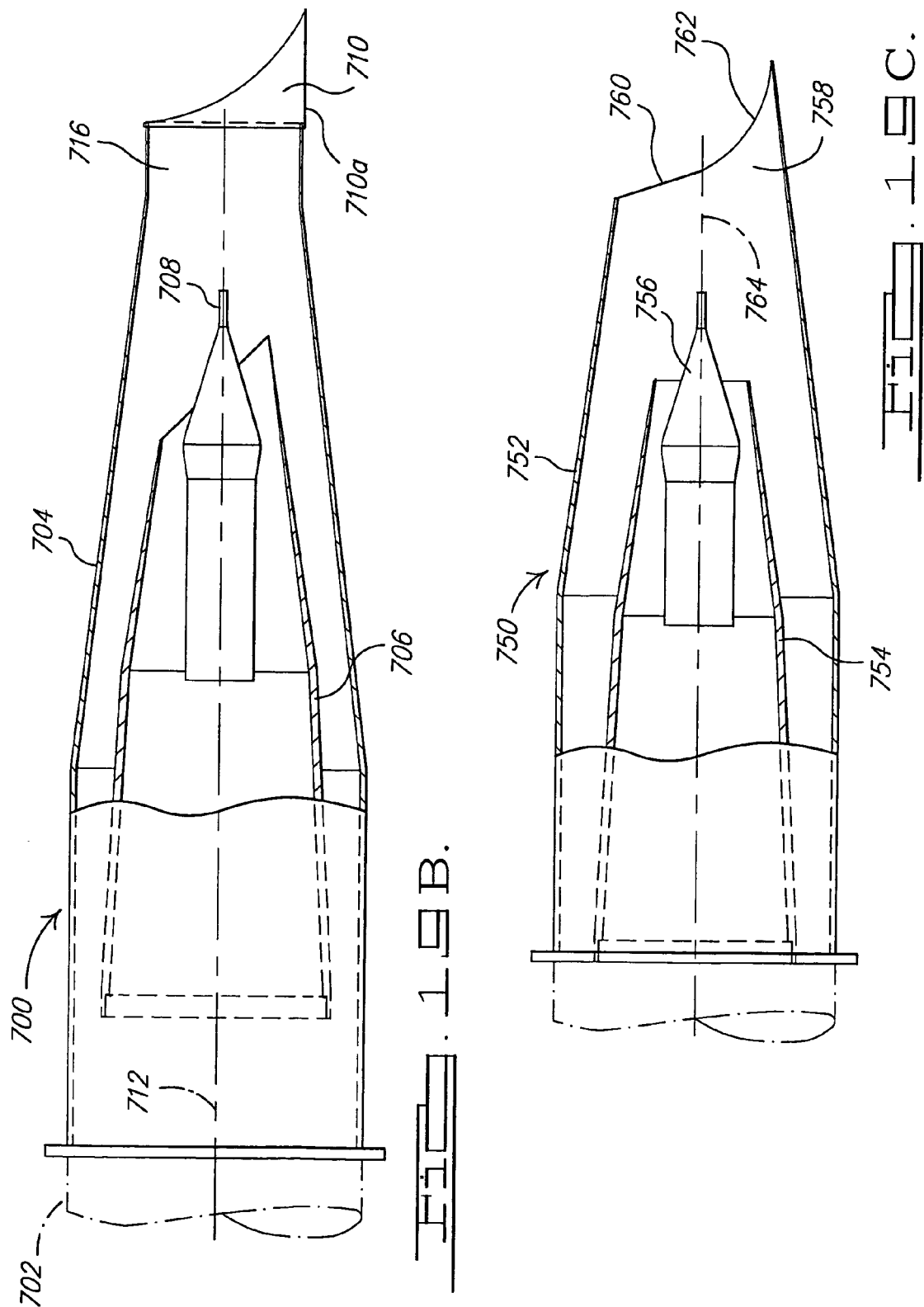

APPARATUS AND METHOD FOR REDUCTION OF JET NOISE FROM TURBOFAN ENGINES HAVING SEPARATE BYPASS AND CORE FLOWS

FIELD OF THE INVENTION

This invention relates to exhaust flow nozzles for jet engines and more particularly to an exhaust flow nozzle for turbofan having separate core flow and bypass flow streams for a jet engine that reduces noise generated by the jet engine.

BACKGROUND OF THE INVENTION

Aircraft noise from commercial and private jet aircraft is an undesirable byproduct of modern aviation. The growth of air travel and the number of jet aircraft operating at present day airports throughout the world has led to an ever increasing level of jet aircraft noise. Additionally, as residential dwellings have been constructed closer and closer to commercial airports, more and more individuals have been exposed to noise from the operation of commercial and private jet aircraft. It will be appreciated that jet aircraft noise is particularly acute during takeoff and landing procedures. During takeoff, the engines on commercial jet aircraft are often operated at maximum thrust and therefore generate very significant sound pressure levels.

To reduce jet noise at commercial airports, various noise abatement procedures and regulations have been implemented in many cities and communities around the world. These abatement procedures often involve monitoring the noise level generated by departing and incoming jet aircraft at various times of the day, the use of nighttime curfews, the use of preferred runways, the use of noise-based landing fees, fines for exceeding predetermined noise levels, limitations on early morning departure times, and various other restrictions. The number of airports that have implemented in many cities some form of noise-related operational restriction has grown dramatically in recent years and is expected to continue to rise.

Aircraft noise is also an important consideration from the perspective of passengers and crew members on board an aircraft while the aircraft is traveling at cruise conditions. Aircraft with quieter interiors are preferred by crew, passengers and airlines. Low cabin noise can be an important marketing factor for airlines.

Thus, there is a continuing need to reduce the noise produced by jet engines used on jet aircraft, both commercial and private, so that cabin noise, as well as community noise experienced around an airport, can be reduced.

SUMMARY OF THE INVENTION

The present invention is directed to an exhaust flow nozzle that reduces the sound pressure level of noise generated by the jet engine in areas below the jet engine. The present invention is particularly effective for reducing noise levels produced by a jet engine during take off and landing operations, and is further specifically adapted for use with turbofan jet engines having separate core flow and bypass flow streams.

In one preferred form, the present invention comprises a tubular flow nozzle having a downstream edge through which an exhaust plume generated by the jet engine exits. The downstream edge forms a beveled surface with the degree of the bevel ranging preferably from about 5°-45° from a plane extending orthogonally to a longitudinal axis of the tubular flow nozzle. In an alternative embodiment the first portion of the downstream edge of the tubular flow nozzle extends orthogonal to the longitudinal axis, while a second adjacent the first portion is beveled such that it extends non-parallel to the first portion. The resulting downstream edge forms a non-linear plane. In still another alternative preferred embodiment the downstream edge includes a curving portion that effectively forms an extension or lip portion at a bottom dead center area of the tubular flow nozzle.

In still another alternative embodiment, the downstream edge includes a combination of a straight beveled portion and a curving portion. In one preferred form, the longer lip of the beveled nozzle is oriented at a suitable angle between the bottom dead center and top dead center.

The above-described alternative preferred forms of the downstream edge of the exhaust flow nozzle are incorporated in a single flow nozzle, a mixed flow exhaust flow nozzle used with a mixed flow turbofan jet engine, and a turbofan jet engine having separate bypass flow and core flow streams that are not mixed.

The various preferred embodiments of the mixed flow exhaust flow nozzle incorporate a primary or core nozzle disposed concentrically therewithin. The primary or core nozzle is disclosed with a nozzle arrangement in which a downstream edge of the primary nozzle is arranged orthogonal to a longitudinal axis of a final nozzle. In an alternative preferred embodiment an exhaust flow nozzle for a mixed flow turbofan engine is disclosed in which a primary nozzle includes a mixer nozzle downstream edge for facilitating a mixture of primary and bypass flow streams prior to the flow streams exiting a downstream edge of the common final nozzle structure, wherein the common final nozzle structure is beveled. The primary or core nozzle has a downstream edge arranged orthogonal to a longitudinal axis of a primary nozzle. In an alternative preferred embodiment, the downstream edge of the primary or core nozzle is beveled. The downstream edge could be a single beveled edge or consist of two beveled portions that are not parallel to each other.

In still further alternative preferred forms, the present invention is directed to an exhaust flow nozzle having a nozzle member which supports a movable nozzle extension. The nozzle extension can be retracted relative to the nozzle member, and can also be extended relative to the nozzle member to extend outwardly of the downstream edge of the nozzle member. The nozzle extension forms a lip for modifying the jet plume emitted from the downstream edge of the nozzle member. In one preferred form the nozzle extension is oriented at a bottom dead center position of the nozzle member.

The various preferred embodiments all modify the jet plume, and the resulting noise, emitted from the exhaust flow nozzle associated with a jet engine such that sound pressure levels below the exhaust nozzle are reduced The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 18 is a simplified side-cross sectional view of another alternative preferred embodiment of the flow nozzle in which a linearly moveable nozzle extension member is housed outside a downstream portion of a common nozzle, and is shown in its retracted position;

FIG. 18a shows a perspective view of the nozzle in FIG. 18;

FIG. 19 is a side view of the nozzle in FIG. 18 in which the nozzle extension member has been extended to form a beveled edge surface;

FIG. 19a shows a perspective view of the nozzle shown in FIG. 19;

FIG. 19b is a side view of another alternative embodiment wherein the trailing edge of the retractable extension has a curved portion.

FIG. 19c is a side view of another alternative preferred embodiment of a mixed flow exhaust nozzle where the downstream edge of a common nozzle includes both a beveled and a curved edge portion.

DETAILED DESCRIPTION OF THE PREFERRED EMBODIMENTS

The following description of the preferred embodiment(s) is merely exemplary in nature and is in no way intended to limit the invention, its application, or uses.

Figure 1:
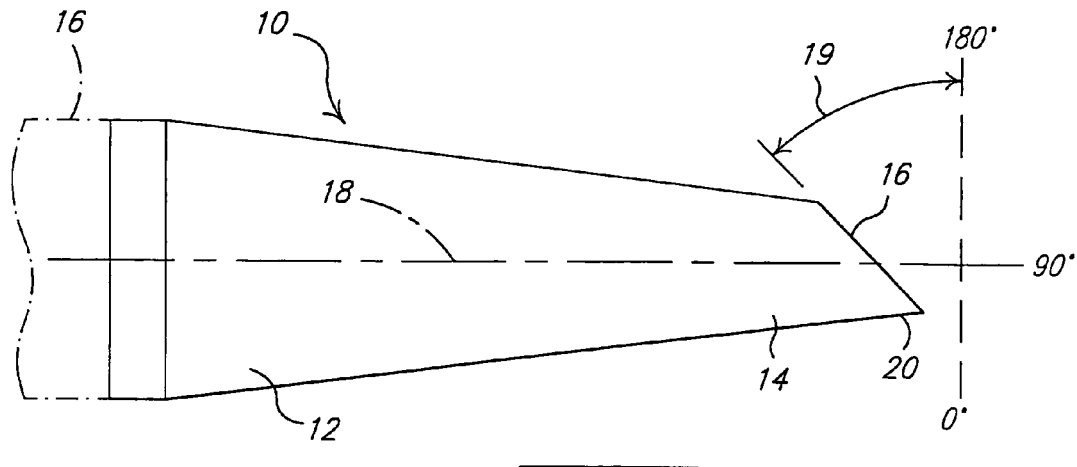
FIG. 1 is a side cross-sectional view of a single exhaust nozzle having a beveled downstream edge portion, in accordance with a preferred embodiment of the present invention.
Figure 1A:
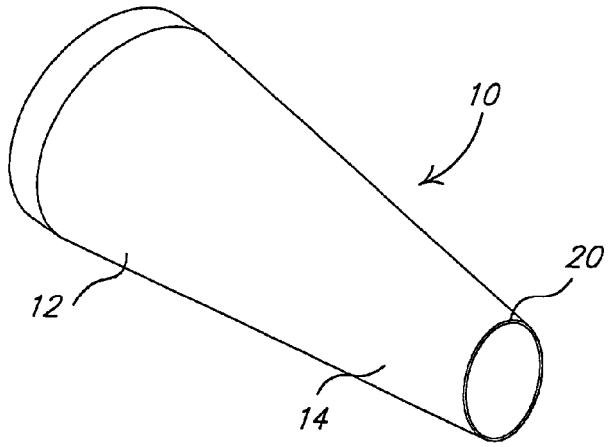
FIG. 1a is a perspective view of the exhaust nozzle of FIG. 1.

Referring to FIG. 1, an exhaust flow nozzle 10 is shown in accordance with a preferred embodiment of the present invention. The exhaust flow nozzle forms a tubular component having an upstream end 12 and a downstream end 14. A jet engine 16 generates exhaust gases which are directed into the nozzle 10 and which exit though the downstream end 14. Downstream end 14 includes a beveled edge 16. Beveled edge 16 is beveled at an angle 19 of preferably of about 5°-50°, although it will be appreciated that this angle could vary from this range to meet the needs of a specific aircraft application. The above-mentioned angle is measured relative to a plane orthogonal to a longitudinal center line 18 extending longitudinally though the nozzle 10. In effect, the downstream end 14 forms a "lip" or extension 20 which helps to alter the flow of exhaust gasses exiting from the nozzle 10 in a manner that reduces sound pressure levels at an area below the nozzle 10 when the nozzle is affixed to an aircraft.

Figure 2:
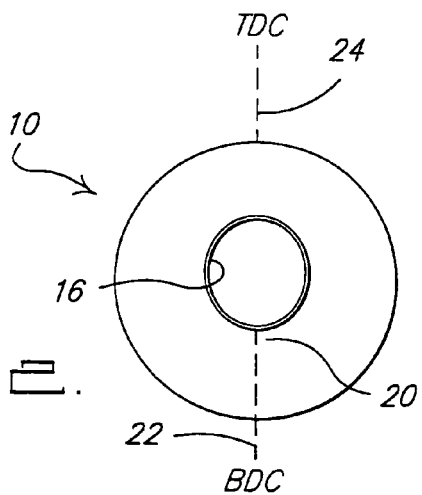
FIG. 2 is an end view of the exhaust nozzle of FIG. 1.

With brief reference to FIG. 2, the lip or extension 20 is arranged at a bottom dead center (BDC) position 22 of the nozzle 10 when the nozzle 10 is secured to supporting structure associated with an aircraft. It will be appreciated that the bottom dead center position 22 faces a ground surface when the nozzle is secured to an aircraft and the aircraft is stationed at an airfield or performing takeoff or landing maneuvers. It will further be understood that a top dead center (TDC) position 24 would be located opposite on the nozzle 10 to the bottom dead center position 22.

With reference to FIGS. 1, 3, and 4-7, the sound pressure level (SPL) is measured in decibels (dBs) and can be seen in various areas around an aircraft 26. With specific reference to FIG. 1, azimuth angles 0°, 90° and 180° are shown relative to the nozzle 10. Zero degrees corresponds to the bottom dead center position 22 (FIG. 2), 90° corresponds to the plane of the longitudinal axis 18, and 180° corresponds to the top dead center position 24 (FIG. 2).

Figure 3:
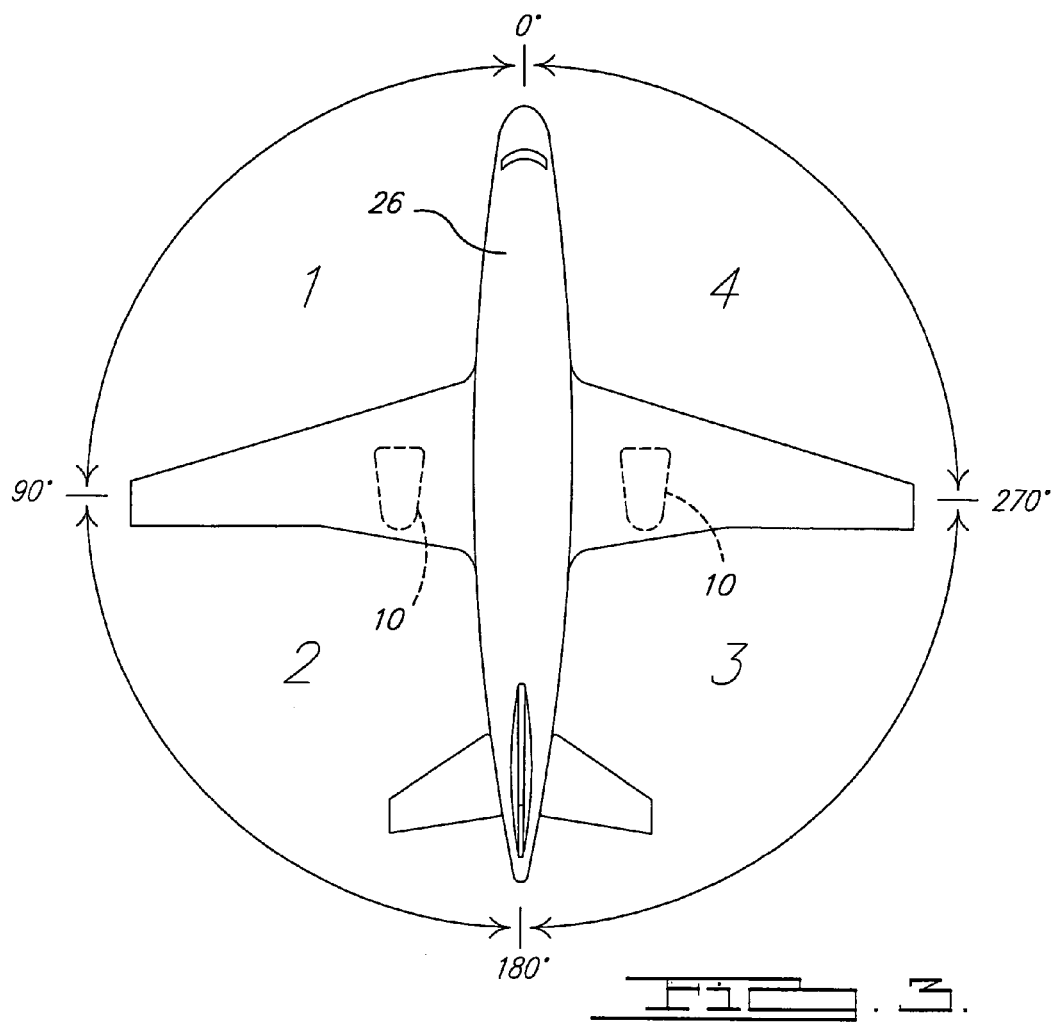
FIG. 3 is a plan view of an aircraft incorporating the exhaust flow nozzle of the present invention, and illustrating the 4 polar quadrants in relation to the aircraft for interpreting the graphs of FIGS. 4-11.
Figure 4:
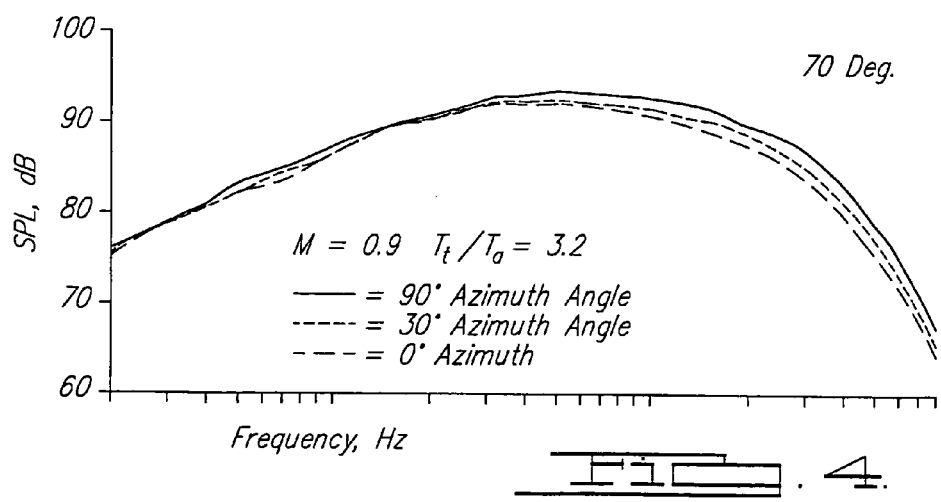
FIG. 4 is a graph of the sound pressure levels recorded at different azimuthal angles in the first polar quadrant of FIG. 3.
Figure 5:
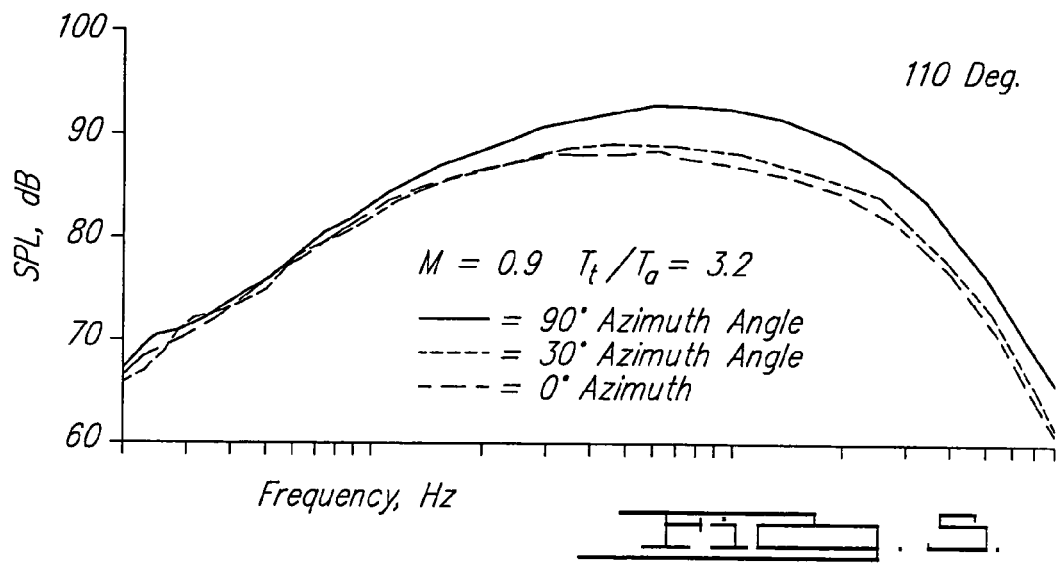
FIG. 5 is a graph of the sound pressure levels recorded at various azimuthal angles in the second polar quadrant of FIG. 3.
Figure 6:
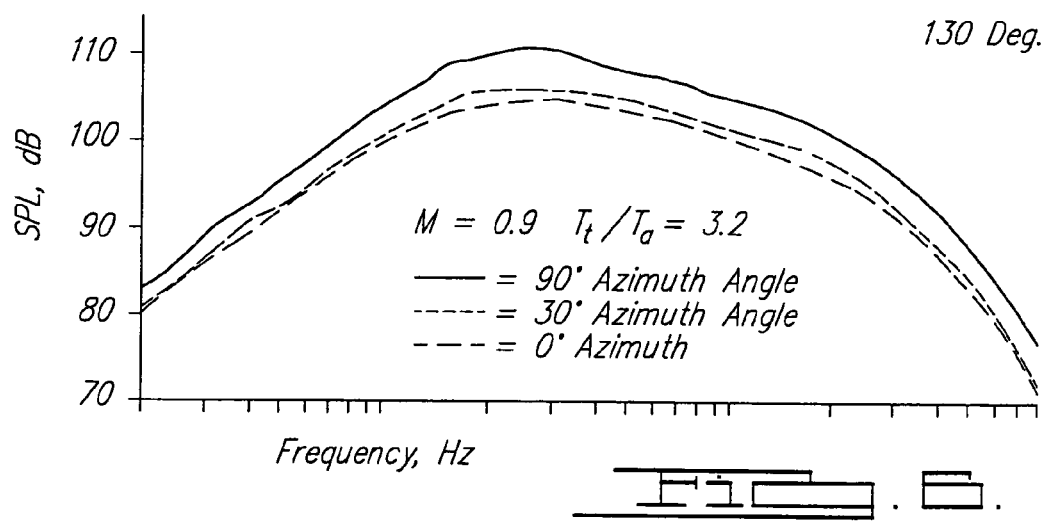
FIG. 6 is a graph of the sound pressure levels recorded at various azimuthal angles in the second polar quadrant of FIG. 3.
Figure 7:
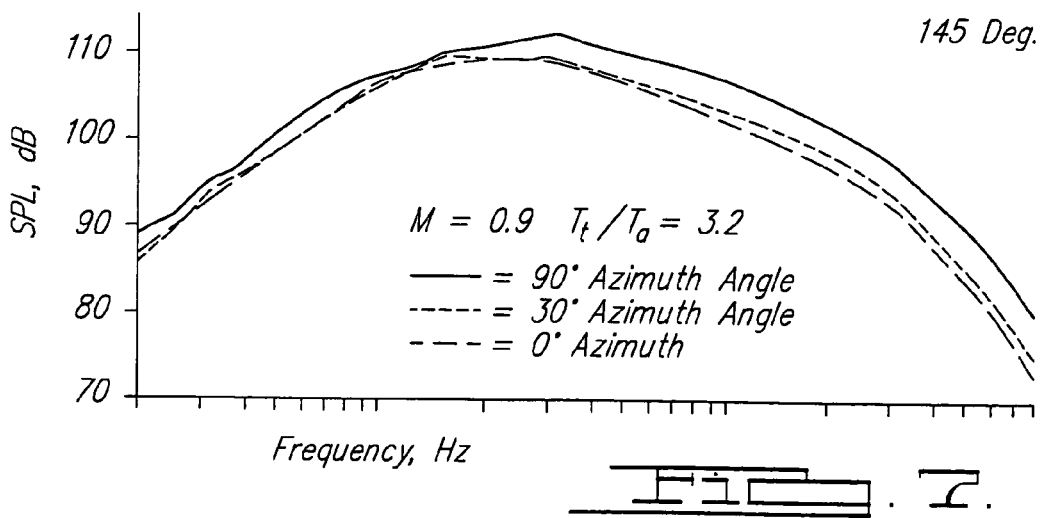
FIG. 7 is a graph of various sound pressure levels recorded at various azimuthal angles in the second polar quadrant of FIG. 3.
Figure 8:
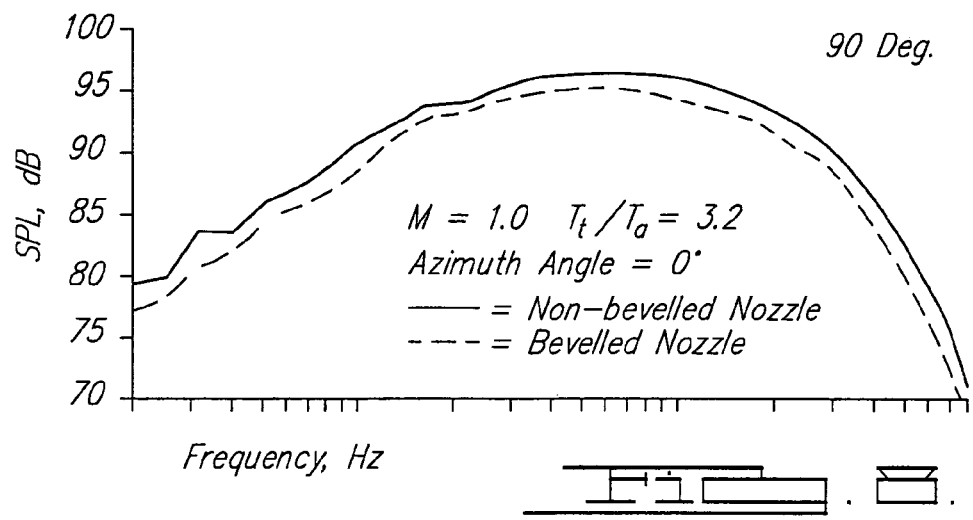
FIG. 8 is a graph of the sound pressure levels recorded at a polar angle of 90° for a conventional exhaust flow nozzle and for a nozzle in accordance with the present invention.
Figure 9:
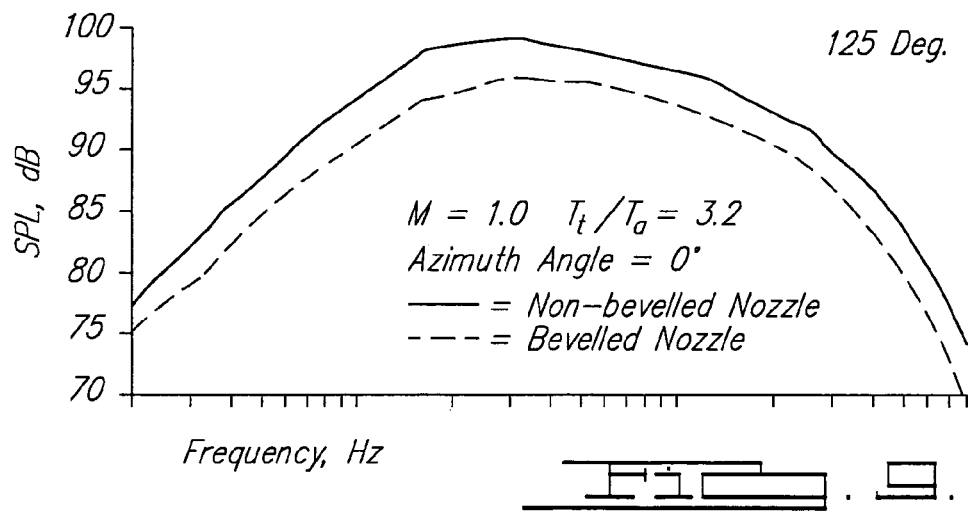
FIG. 9 is a graph of the sound pressure levels recorded at a polar angle of 125° for a conventional nozzle and for an exhaust flow nozzle in accordance with the present invention.
Figure 10:
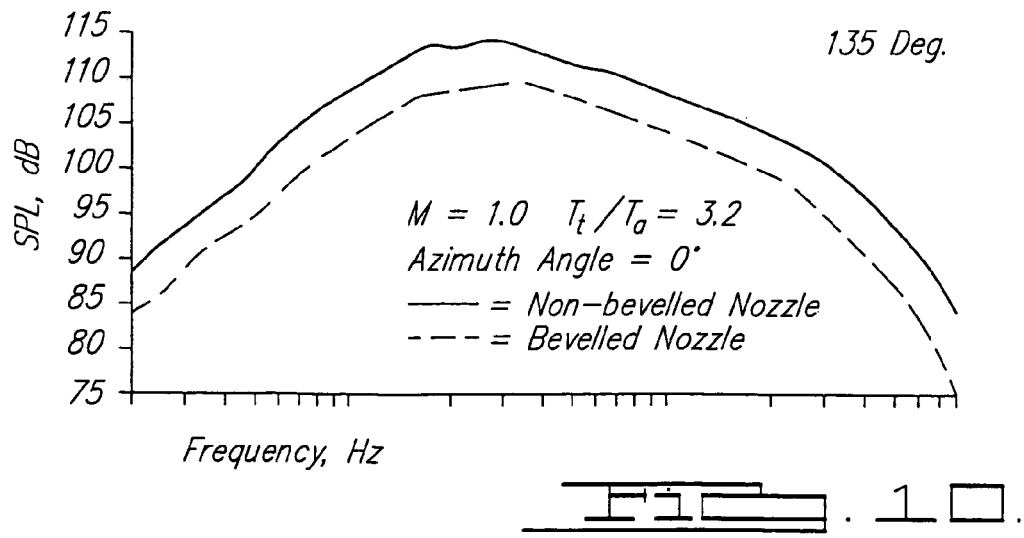
FIG. 10 is a graph of the sound pressure levels recorded at a polar angle of 135° for a conventional exhaust nozzle and a beveled exhaust nozzle in accordance with the present invention.
Figure 11:
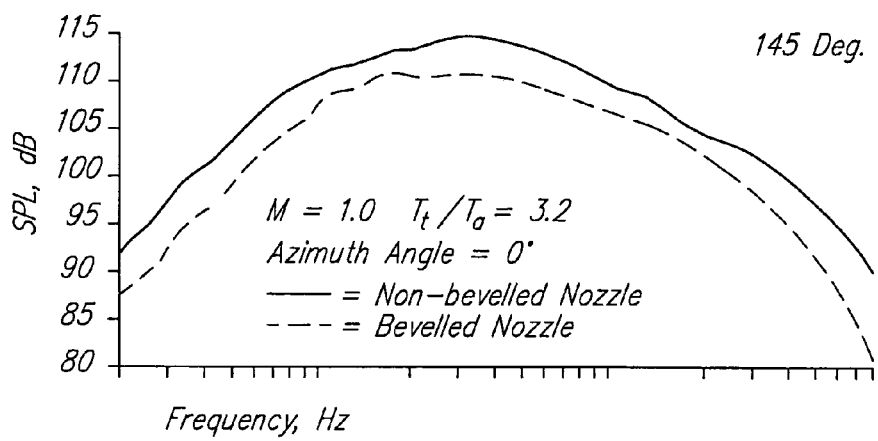
FIG. 11 is a graph of the sound pressure levels recorded at a polar angle of 145° for a conventional exhaust nozzle and a beveled nozzle in accordance with the present invention.

With specific reference to FIG. 3, the four polar quadrants used to interpret the graphs of FIGS. 4-7 are illustrated. Polar angles between 1°-90° correspond to the forward portion of an aircraft 26 on the port side (i.e., quadrant 1). Polar angles 91°-180° correspond to the quadrant at the aft portion of the aircraft 26 on the port side (quadrant 2). Polar angles 181°-270° correspond to quadrant 3 which is at the aft end of the aircraft on the starboard side. Polar angles 271°-360° correspond to quadrant 4 which is at the forward, starboard portion of the aircraft.

The graphs of FIGS. 4-7 illustrate the sound pressure level, in decibels, at various frequencies at three different azimuthal angles for polar angles 70°, 110°, 130° and 145°. For FIGS. 5, 6 and 7, it can be seen that the level of noise radiation at an azimuthal angle of 90° is significant over the sound pressure level produced at an azimuthal angle of 0°.

Referring to FIGS. 8-11, a direct comparison between a conventional exhaust nozzle having a non-beveled downstream edge, and the exhaust nozzle 10 of the present invention, can be seen for an azimuthal angle of 0°. It will be noted that there is a substantial reduction of about 5 db in sound pressure level across the spectrum at the aft angles (i.e., quadrant 2) where the jet noise peaks. Reductions of similar magnitudes have been noted at an azimuthal angle of 30° as well. It will be noted that there is noise reduction at all frequencies. Accordingly, the beveled nozzle 10 yields significant reduction in sound pressure levels for the jet noise generated under the flight path of an aircraft. In effect, the lip portion 20 of the beveled nozzle 10, with its bottom dead center position, effectively helps to radiate the noise emitted from the nozzle 10 up towards the sky. Essentially, because of significant radiation of acoustic energy at the top dead center position 24 (FIG. 2) of the nozzle 10, less acoustic energy becomes available for radiation to the aft direction of the aircraft (polar quadrants two and three), where peak noise radiation typically occurs for a conventional exhaust nozzle. This is why the nozzle 10 of the present invention achieves a noise level reduction across all frequency spectra. Furthermore, the noise reduction provide by the nozzle 10 is even greater at higher flow velocities, since the noise generated by large scale turbulent structures in the plume of a jet engine is more pronounced at higher exhaust flow velocities. The present invention 10 thus modifies the radiation pattern of noise generated by a jet engine to more effectively direct the noise towards the top dead center position 24 of the nozzle 10.

Figure 12:
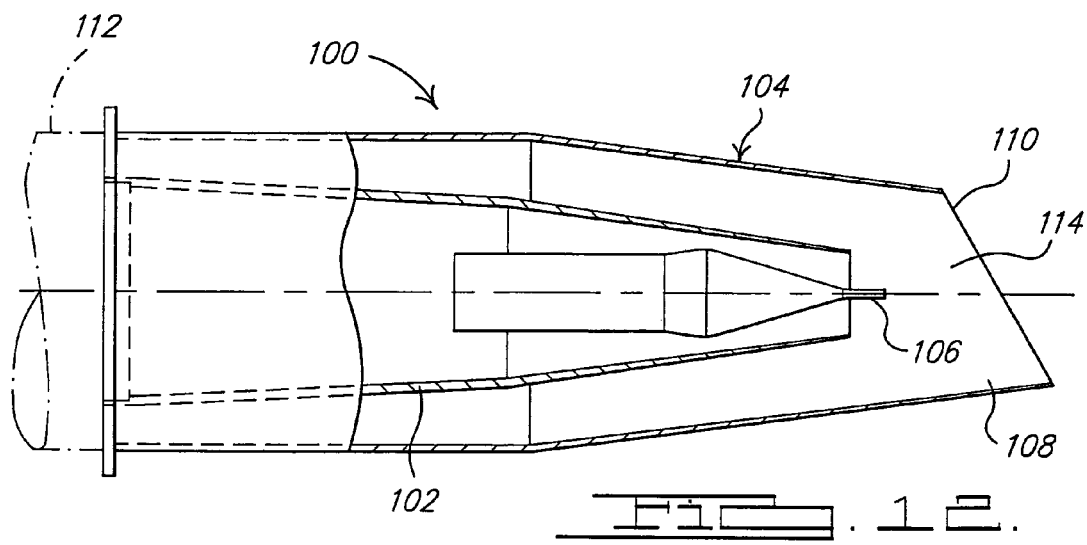
FIG. 12 is a side-cross sectional view of an exhaust nozzle for a mixed flow turbofan jet engine in which a downstream edge of the common nozzle includes a beveled surface.

Referring to FIG. 12, an exhaust nozzle 100 in accordance with an alternative preferred embodiment of the present invention is shown. Exhaust flow nozzle 100 is comprised of a primary or core nozzle 102 and a common or final nozzle 104. The primary nozzle 102 forms a well known "splitter" nozzle having a plug 106 projecting slightly outwardly therefrom. A downstream edge 108 of the final nozzle 104 includes a beveled edge 110. Beveled edge 110 is formed at an angle of preferably about 5°-50°, although it will be appreciated that this range can vary to suit the needs of a specific application. The exhaust flow nozzle 100 is adapted for use with a mixed flow turbofan engine 112. The exhaust flow nozzle 100 enables a degree of mixing of the exhaust and fan flows to be accomplished within an area 114 before the intermixed plume exits the final nozzle 104.

Figure 13:
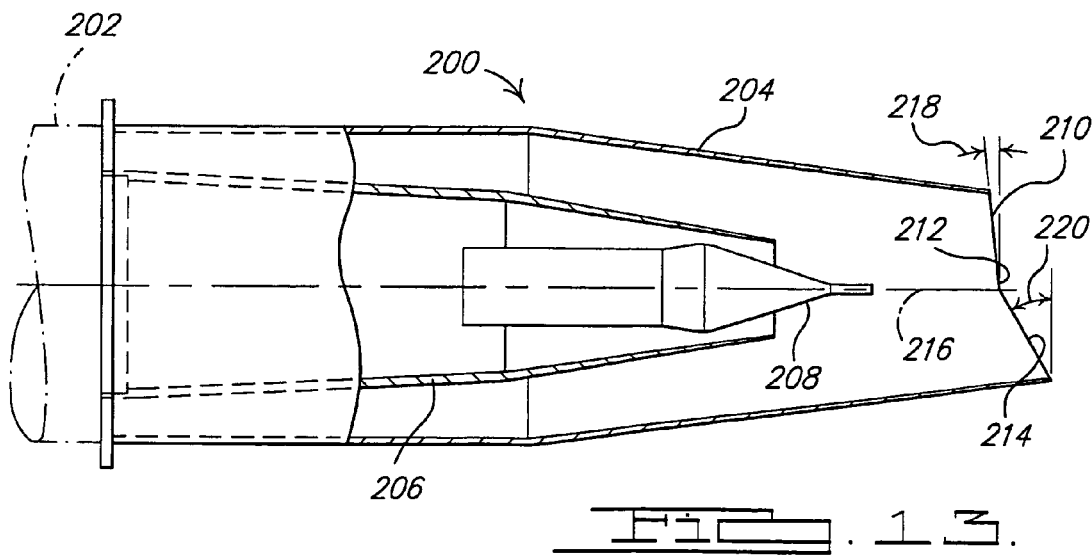
FIG. 13 is a side-cross sectional view of an alternative preferred embodiment of the present invention illustrating a mixed flow nozzle for a jet engine in which a downstream edge of the common nozzle includes a non-linear edge with two distinct beveled surfaces.

Referring to FIG. 13, an exhaust flow nozzle 200 in accordance with another preferred embodiment of the present invention is shown. Exhaust flow nozzle 200 is for use with a mixed flow turbofan engine 202. It is similar to nozzle 100 and also includes a final output nozzle 204 within which is concentrically disposed a primary nozzle 206 forming a simple splitter nozzle with a plug 208. The principal difference between nozzle 200 and nozzle 100 is that nozzle 200 includes a non-linear downstream edge 210. Edge 210 is comprised of a first edge 212 and a second edge 214 disposed adjacent one another. Edges 212 and 214 are disposed on opposite sides of a longitudinal center line 216 extending through the nozzle 200, although it will be appreciated that the precise demarcation between edge surfaces 212 and 214 could be formed so as to be above or below the longitudinal center line 216. The bevel of edge 212, as denoted by angle 218, is preferably within the range of about 0°-10° although it will be appreciated that this range can vary to suit the needs of a specific application. The degree of beveled edge 214, denoted by angle 220, is preferably between about 10°-50°. The beveled edge 214 is preferably located at a bottom dead center position of the nozzle 200, although it will be appreciated that this position can be varied to suit specific aircraft applications.

Figure 14:
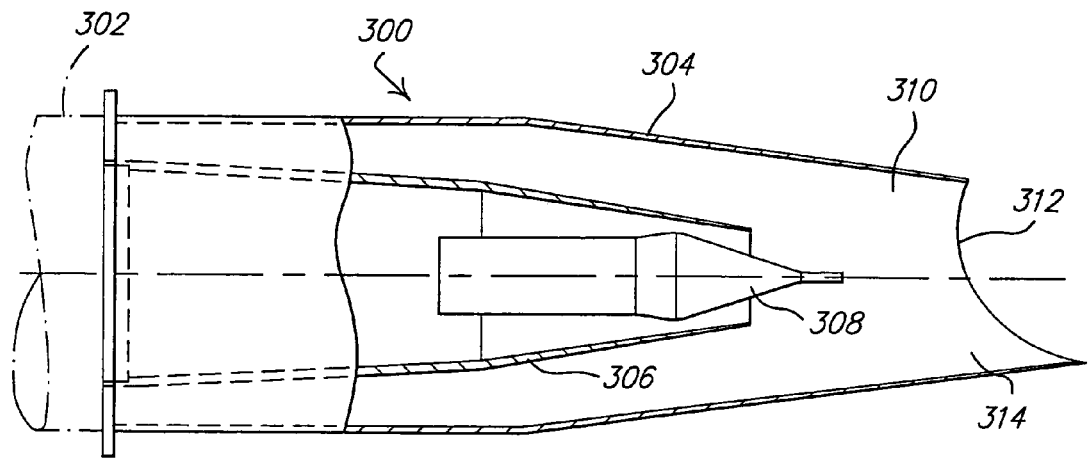
FIG. 14 is an illustration of a nozzle in accordance with another alternative preferred form of the present invention for use with a mixed flow jet engine in which a downstream edge of a common flow nozzle includes a curved outer edge surface.
Figure 14A:
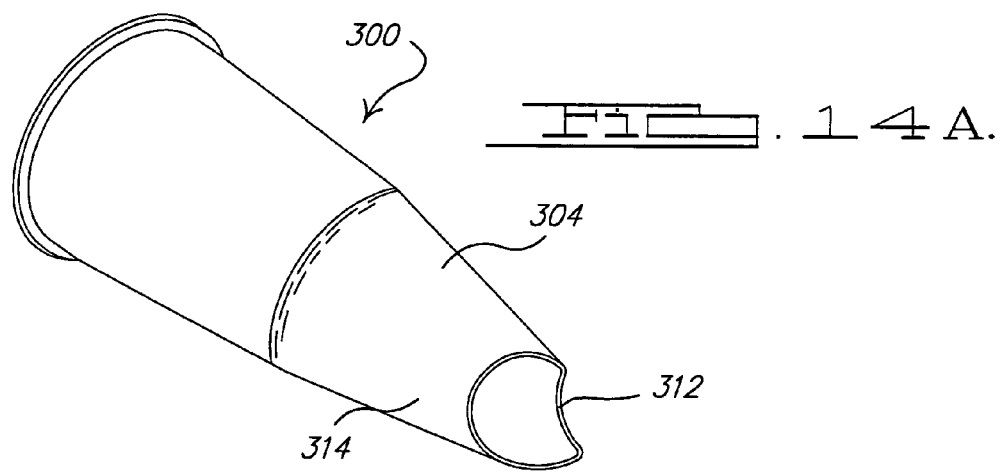
FIG. 14a is a rear perspective view of the nozzle of FIG. 14.

Referring to FIGS. 14 and 14a, still another exhaust flow nozzle 300 is illustrated in accordance with another alternative preferred embodiment of the present invention. Exhaust nozzle 300 is also for use with a mixed flow turbofan engine 302 and includes a final output nozzle 304 within which is concentrically disposed a primary nozzle 306. Primary nozzle 306 forms a conventional splitter nozzle having a plug 308. The principal difference between exhaust flow nozzle 300 and nozzle 200 is that nozzle 300 includes a downstream end 310 having a curved edge portion 312. The precise curvature of curved edge 312 may be varied as needed to suit specific aircraft applications. Curved edge portion 312 is also preferably orientated such that a lip portion 314 is orientated at a bottom dead center position of the nozzle 300, but lip portion 314 could also be oriented at a position intermediate the top dead center and bottom dead center positions.

Figure 15:
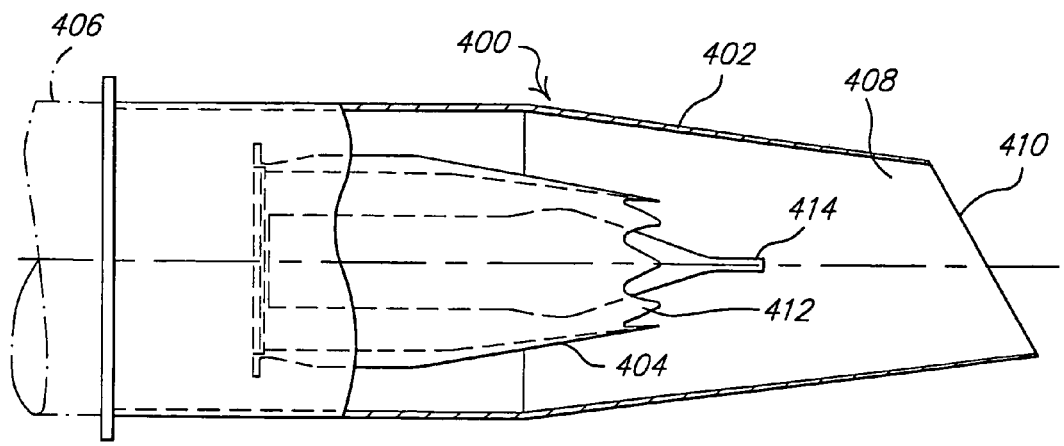
FIG. 15 illustrates a side-cross sectional view of a mixed flow nozzle system in which a primary nozzle forms a mixer nozzle, and a common nozzle includes a beveled edge surface.

FIG. 15 shows an exhaust flow nozzle 400 in accordance with yet another alternative embodiment of the present invention. Nozzle 400 includes a final output nozzle 402 and primary 404. Nozzle 400 is adapted for use with a mixed flow turbofan engine 406. The final nozzle 402 includes a downstream portion 408 having a beveled edge 410. The nozzle 400 is essentially identical to nozzle 100 with the exception that the primary nozzle 404 forms a mixer nozzle having chevrons or a lobed mixer 412 projecting therefrom for aiding in mixing exhaust and bypass flow streams. A plug 414 can be seen projecting from the primary nozzle 404. The angle of the beveled edge 410 is also preferably within about 10°-50°, although this can be varied significantly to suit specific aircraft applications.

Figure 16:
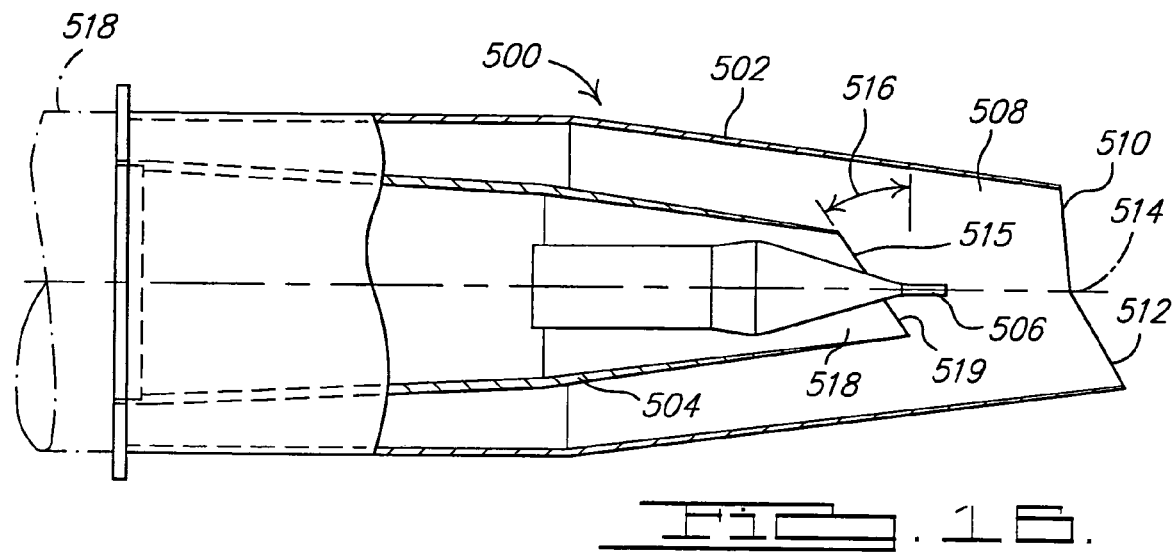
FIG. 16 illustrates another alternative preferred embodiment showing an exhaust nozzle for a mixed flow turbofan engine in which a primary nozzle includes a beveled downstream edge, and a common nozzle includes a beveled downstream edge with two distinct beveled surfaces.

Referring now to FIG. 16, an exhaust flow nozzle 500 in accordance with yet another alternative preferred embodiment of the present invention is shown. Nozzle 500 similarly includes a final flow nozzle 502 and a primary nozzle 504 disposed concentrically within the final flow nozzle 502. Primary nozzle 504 forms a conventional splitter nozzle having a plug 506 projecting outwardly therefrom. A downstream edge 508 of the final nozzle 502 also includes two beveled surfaces 510 and 512 disposed on opposite sides of a longitudinal centerline 514 extending through the final nozzle 502. The principal difference between nozzle 500 and nozzle 200 is the inclusion of a beveled edge 515 formed on the primary nozzle 504. This further serves to alter the exhaust flow stream by changing the mixing characteristics of the two streams inside the nozzle 500. The angle 516 of the beveled edge 515 is also preferably between about 10°-50°, but could be varied considerably to suit the needs of a specific aircraft application. Nozzle 500 is particularly well adapted for use with a mixed flow turbofan engine 518. The beveled edge 515 also forms a lip portion 519 that is disposed at a bottom dead center position of the primary nozzle 504 or could be oriented at a suitable angle between the bottom dead center and top dead center.

Figure 17:
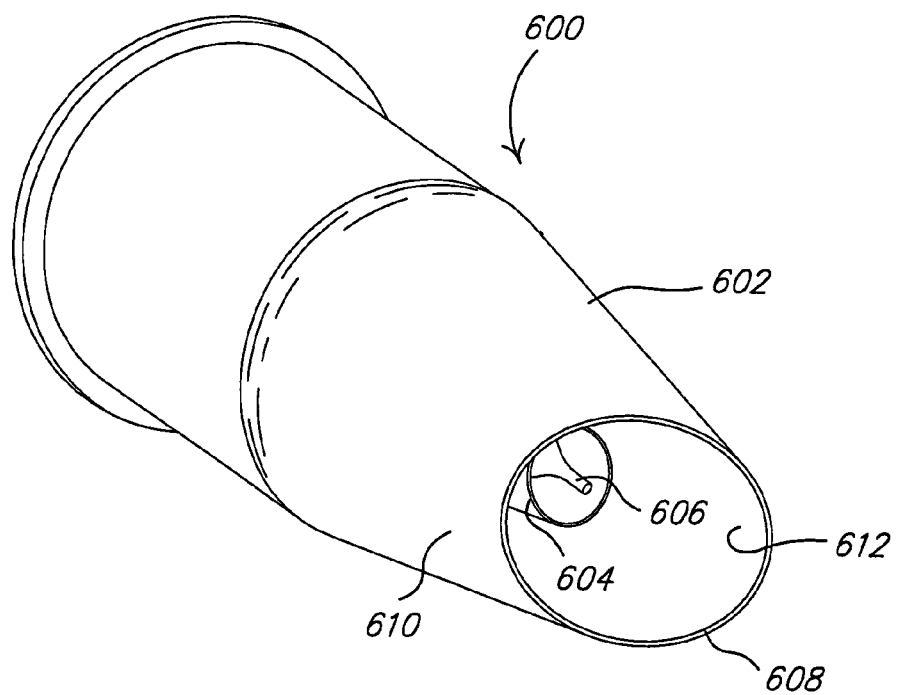
FIG. 17 illustrates a perspective view of an alternative preferred embodiment of the flow nozzle in which a common flow nozzle has an elongated lip portion forming a beveled outer edge surface that is positioned at approximately a three o'clock position.

Referring now to FIG. 17, an exhaust flow nozzle 600 is shown in accordance with yet another alternative preferred embodiment of the present invention. Exhaust flow nozzle 600 is intended for use with a mixed flow turbofan engine (not shown) and includes a final nozzle 602 and primary nozzle 604 disposed concentrically within the final nozzle 602. The primary nozzle 604 forms a simple splitter nozzle having a plug 606 projecting therefrom. The principal difference between nozzle 600 and nozzle 100 is that nozzle 600 includes a beveled edge surface 608 at a downstream end 610 which is canted to place a protruding lip portion 612 at an intermediate location in between top dead center and bottom dead center positions when the nozzle is being supported from an aircraft. In this specific example, lip portion 612 is orientated at a three o'clock position to provide a level of additional noise reduction inside a cabin area of an aircraft during cruise conditions. In this regard it will be appreciated that the flow nozzle 610 will be located on the port side of an aircraft so as to oriented to help direct jet noise away from the fuselage of the aircraft. The jet engine on the starboard side would instead have nozzle 600 oriented with lip portion 612 at the nine o'clock position to also help direct jet noise from its associated engine away from the aircraft. Nozzle 600 is further adapted for use with a mixed flow turbofan engine, not shown.

Referring to FIGS. 18 and 19, an exhaust flow nozzle 700 in accordance with still another alternative preferred embodiment of the present invention is shown. Exhaust flow nozzle 700 is adapted for use with a mixed flow turbofan engine 702 and includes a final nozzle 704 and a primary flow nozzle 706 disposed concentrically within the final nozzle 704. Primary flow nozzle 706 includes a plug 708 projecting therefrom and forms a simple splitter nozzle.

Primary nozzle 704 differs from previously described primary nozzles herein through the use of a linearly movable flow altering component 710 disposed concentrically outside the final nozzle 704 along the longitudinal axis 712, and at a downstream end 704a, of the final nozzle 704. The flow altering component 710 basically forms a tubular component that is supported for linear movement at a downstream edge 716 of the final nozzle 704. Any suitable linkage/component can be used to linearly move the flow altering component 710 between its retracted position shown in FIG. 18 to its extended position shown in FIG. 19. When in the retracted position of FIGS. 18 and 18a, the flow altering component 710 essentially has no impact on the jet plume exiting the final nozzle 704. However, when the flow altering component 710 is moved into its extended position as shown in FIGS. 19 and 19a, the lower most area 710a of the component 710 essentially forms a lip portion arranged at a bottom dead center of the final nozzle 704. The lip portion 710a essentially serves to modify the jet plume and direct the jet noise upwardly away from the ground surface. When the flow altering component 710 is in its retracted position of FIGS. 18 and 18a, it has essentially no effect on the exhaust flow leaving the final flow nozzle 704. Thus, the flow altering component 710 can be retracted during cruise conditions, and yet quickly deployed for landing and takeoff operations where noise reduction at areas below the aircraft is an important consideration.

FIG. 19b discloses an alternative form 710' of the retractable, extendable, flow altering component 710 which is curved.

Referring to FIG. 19c, still another alternative preferred embodiment is shown in the form of an exhaust nozzle 750 for a mixed flow turbofan engine. Nozzle 750 includes a final output nozzle 752 within which is disposed a primary nozzle 754 having a center plug 756. The final nozzle 752 has a downstream end 758 with a first beveled edge portion 760 and a second curving edge portion 762. Edge portions 760 and 762 are disposed on opposite side of longitudinal center line 764, but the precise point demarcating the two edge portions 760 and 762 could be varied slightly above or below center line 764 to suit specific aircraft applications.

It will be appreciated then that the various preferred embodiments described herein all enable a significant level of noise reduction to be achieved at areas below an aircraft during take off and landing procedures. At least one embodiment enables an additional degree of noise reduction to be achieved relative to the cabin area within an aircraft while the aircraft is traveling at cruise conditions. The various preferred embodiments do not add significantly to the structural complicity of present day exhaust flow nozzles used on modern commercial aircraft, and further do not require significant added expense or modification to the jet engines which these nozzles are typically used with.

Figure 20:
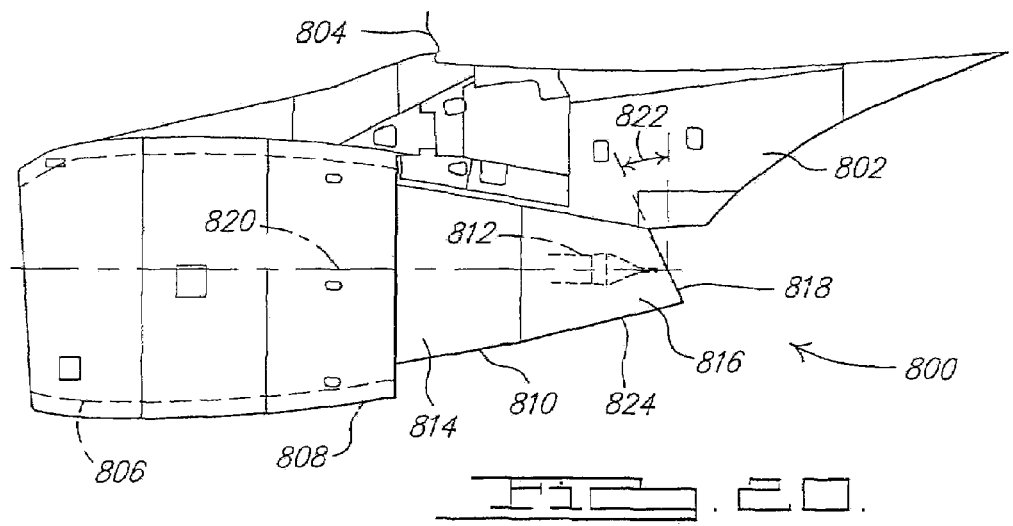
FIG. 20 is a simplified side view of an exhaust nozzle system in accordance with an alternative preferred embodiment of the present invention, wherein the nozzle system is adapted for use with a turbofan jet engine having a fan flow stream and a core flow stream that are not mixed, and wherein a primary nozzle incorporates a beveled edge surface.

Referring now to FIG. 20, an exhaust nozzle system 800 is shown in accordance with another alternative preferred embodiment of the present invention. Exhaust nozzle system 800 is supported by a strut 802 or other suitable structure to a wing 804 of an aircraft or other structural portion of a mobile platform. The exhaust nozzle system 800 is for use with a separate flow, turbofan jet engine 806 that provides separate fan flow and core flow streams. The exhaust nozzle system 800 includes a bypass nozzle 808 within which is concentrically disposed a primary nozzle 810. Within the primary nozzle 810 is a center plug 812. The primary nozzle 810 includes an upstream portion 814 and a downstream portion 816. Downstream portion 816 includes a beveled edge 818 that extends non-parallel to a longitudinal axis 820 extending through the exhaust nozzle system 800. The angle of the beveled edge 818, as denoted by angle 822, is also preferably between about 5°-45°, but it will be appreciated that this angle could vary significantly to suit the needs of specific aircraft application. It will also be noted that the overall length of the primary nozzle 810 is sufficient such that a bottom dead center area 824 of the downstream edge 816 extends longitudinally past the center plug 812. It will also be noted that the current invention would be equally applicable to turbofan engines with separate bypass and core flows that are not mixed in which the center plug is entirely with the primary nozzle (internal plug) or with the center plug protruding beyond the trailing edge of the primary nozzle (external plug).

Figure 21:
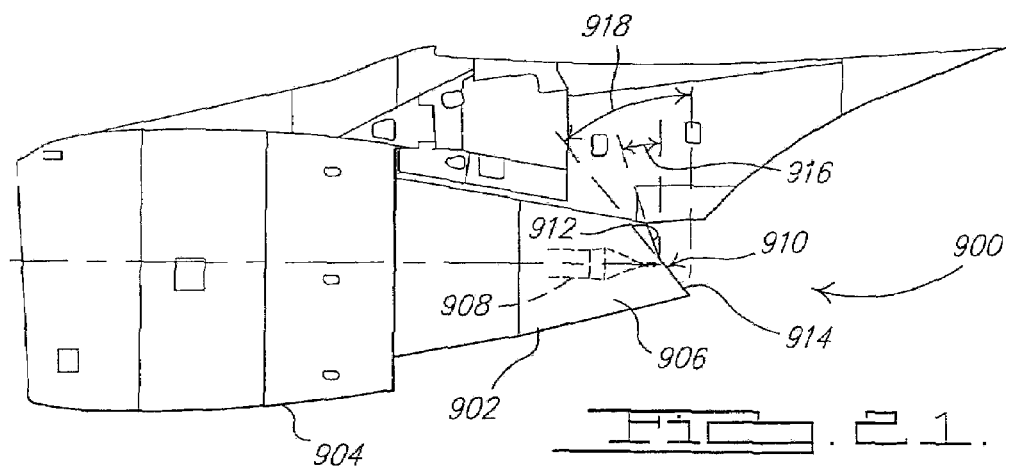
FIG. 21 is a side view of another alternative preferred embodiment in which an exhaust nozzle for a turbofan engine having separate fan flow and core flow streams, and a downstream edge having two distinct beveled surfaces, is disclosed.

Referring to FIG. 21, an exhaust nozzle system 900 is shown in accordance with another alternative preferred embodiment. Nozzle system 900 is similar to system 800 and includes a primary nozzle 902 disposed partially within an outer fan nozzle 904. Nozzle system 900 is intended to be used with a turbofan jet engine providing separate fan flow and core flow streams that are not mixed. Primary nozzle 902 has a downstream portion 906 that houses a center plug 908. The downstream portion 906 includes a bi-planar downstream edge portion 910 made up of a first linear section 912 and a second linear section 914 disposed adjacent to the first linear section 912. The first linear section 912 is further formed so as to provide a slight degree of bevel, as indicated by angle 916. Likewise, the second section 914 is formed to provide a degree of bevel, as indicated by angle 918, which is greater than the degree of bevel provided by section 912. In another preferred embodiment bevel angle 916 could be greater than bevel angle 918.

Figure 22:
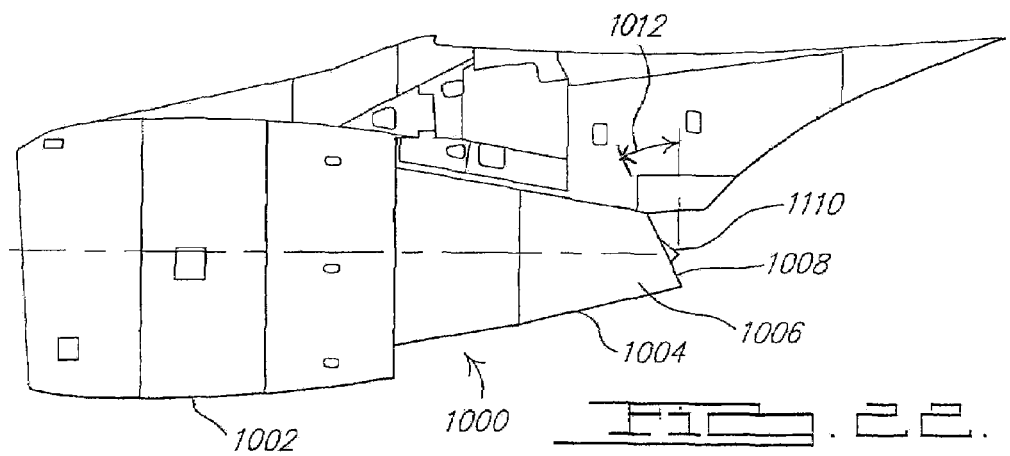
FIG. 22 is an exhaust flow system in accordance with another alternative preferred embodiment, and specifically adapted for a turbofan jet engine have separate fan flow and core flow streams, and where the downstream edge of the primary exhaust nozzle is beveled to allow a portion of a center plug to protrude therefrom.

Referring to FIG. 22, an exhaust system 1000 in accordance with another preferred embodiment of the present invention is shown. Exhaust system 1000 is specifically adapted for use with a jet turbofan engine that provides separate fan flow and core flow streams that are not mixed. The exhaust system 1000 includes a fan nozzle 1002 and a primary nozzle 1004 disposed partially within the fan nozzle 1002 and concentrically therewith. The primary nozzle 1004 includes a downstream portion 1006 having a downstream edge 1008. The length of the primary nozzle 1004 is such that a center plug 1010 protrudes slightly therefrom. The downstream edge 1008 is also beveled, as indicated by angle 1012. Angle 1012 preferably forms an angle of about 5°-45°. In another preferred embodiment the shape of the center plug 1010 is modified to achieve optimum aeroacoustic performance. This shape optimization is in conjunction with the beveled edge 1008.

Figure 23:
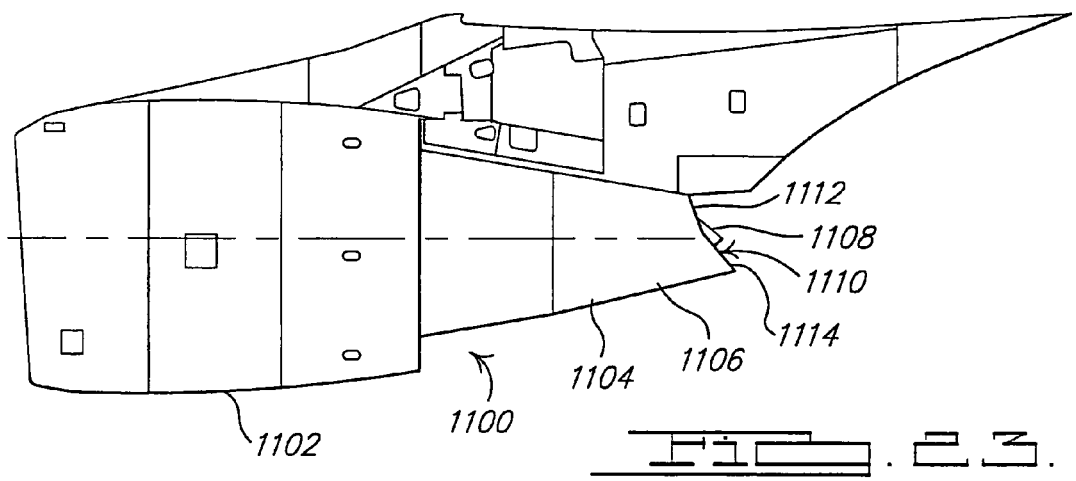
FIG. 23 is a side view of yet another alternative preferred embodiment showing an exhaust nozzle system adapted for a turbofan jet engine having separate fan flow and core flow streams that are not mixed, and where a primary nozzle has an outer edge having two distinct beveled surfaces that allow a portion of a center plug to protrude therefrom.

Referring now to FIG. 23, an exhaust flow system 1100 is shown in accordance with another alternative preferred embodiment of the present invention. Exhaust system 1100 is also intended specifically for use with a turbofan jet engine that provides separate bypass flow and core flow streams that are not mixed. Exhaust system 1100 includes a fan flow nozzle 1102 and a primary nozzle 1104 disposed concentrically with the fan nozzle 1102. The primary nozzle 1104 includes a downstream portion 1106 having a length that allows a portion of a center plug 1108 to protrude therefrom. The downstream edge portion 1110 includes linear surface portions 1112 and 1114 positioned adjacent one another. Angles formed by portions 1112 and 1114 are preferably identical to angles 916 and 918 in FIG. 21.

Figure 24:
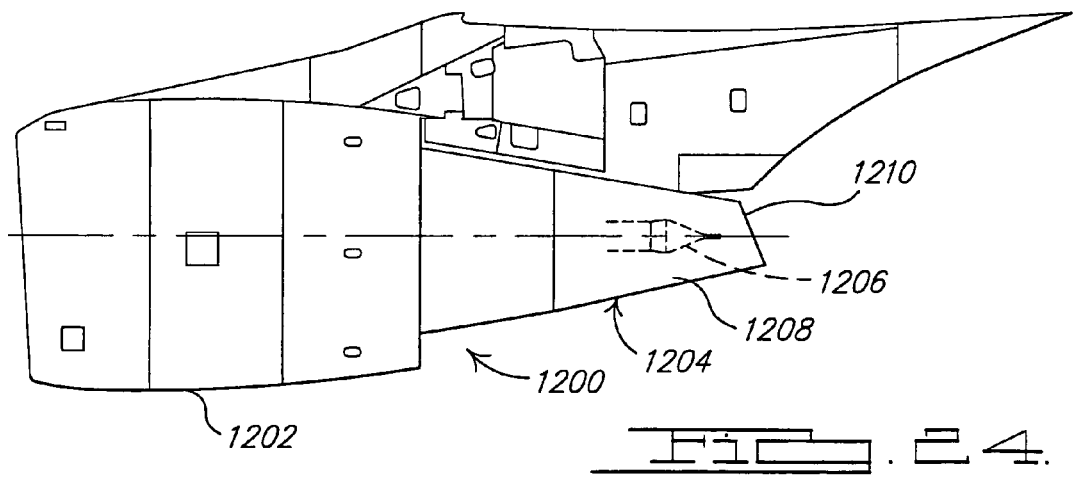
FIG. 24 is a side view of an exhaust flow system in accordance with another alternative preferred embodiment specifically adapted for use with a turbofan jet engine having separate fan flow and core flow streams that are not mixed, and where a beveled edge is formed in a downstream edge of a primary nozzle, and the primary nozzle encapsulates a center plug therein.

Referring to FIG. 24, an exhaust system 1200 is shown in yet another alternative embodiment of the present invention. Exhaust system 1200 is also specifically adapted for use with a turbofan jet engine that provides separate fan flow and core flow streams that are not mixed. Exhaust system 1200 includes a fan nozzle 1202 and a primary nozzle 1204 disposed concentrically partially within the fan nozzle 1202. The primary 1204 has a length sufficient to completely enclose a center plug 1206. A downstream edge 1208 of the primary nozzle 1204 includes a beveled edge portion 1210 having an angle within the range defined by angle 822 in FIG. 20.

Figure 25:
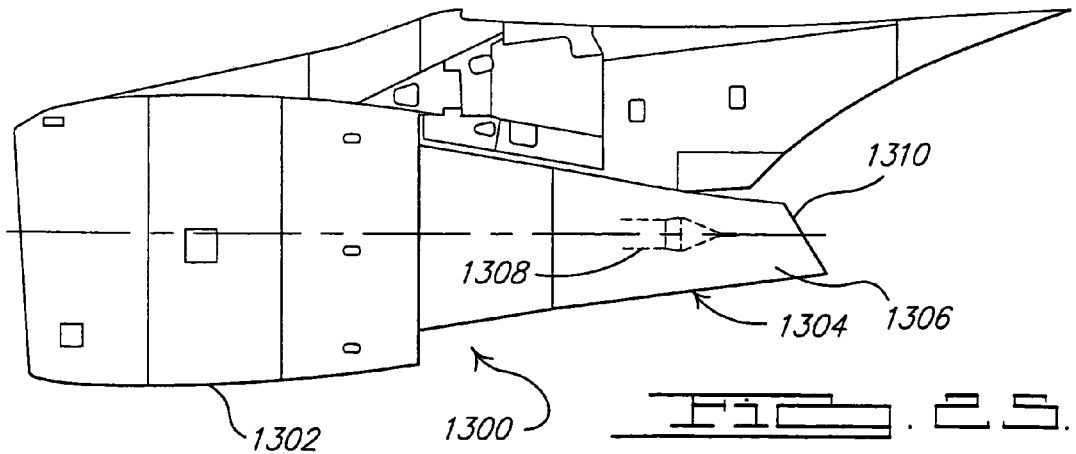
FIG. 25 is a view of an alternative preferred form of the nozzle in FIG. 24 having an elongated nozzle portion that extends significantly past the internally located center plug.

Referring to FIG. 25, an exhaust flow system 1300 is shown in accordance with another alternative preferred embodiment of the present invention. Exhaust system 1300 is likewise adapted specifically for use with a turbofan jet engine that provides separate fan flow and core flow streams that are not mixed. The exhaust system 1300 includes a fan nozzle 1302 and a primary nozzle 1304 extending from the fan nozzle 1302 and disposed concentrically therewith. The primary nozzle 1304 has an elongated, downstream section 1306 that extends well past a center plug 1308. The length of the elongation is optimized for each aircraft/engine combination so as to prevent/minimize the impingement of the jet plume on the underside of the wing and provide the best aerocoustic performance. A downstream edge 1310 is also beveled, preferably at an angle within the range defined by angle 822 of FIG. 20.

Figure 26:
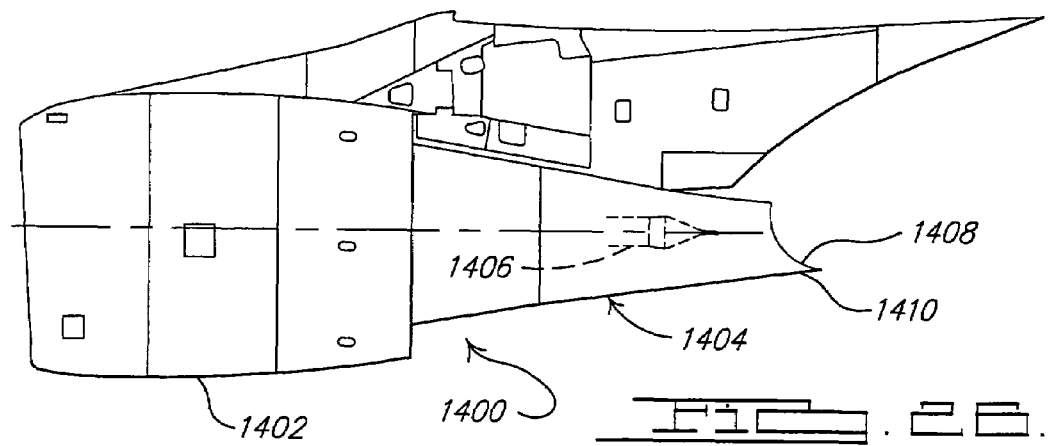
FIG. 26 is an alternative preferred embodiment of an exhaust flow nozzle system specifically adapted for use with a turbofan jet engine providing separate fan flow and core flow streams that are not mixed, and where a downstream edge of a primary nozzle is curved with a lip portion extending at a bottom dead center position.
Figure 27:
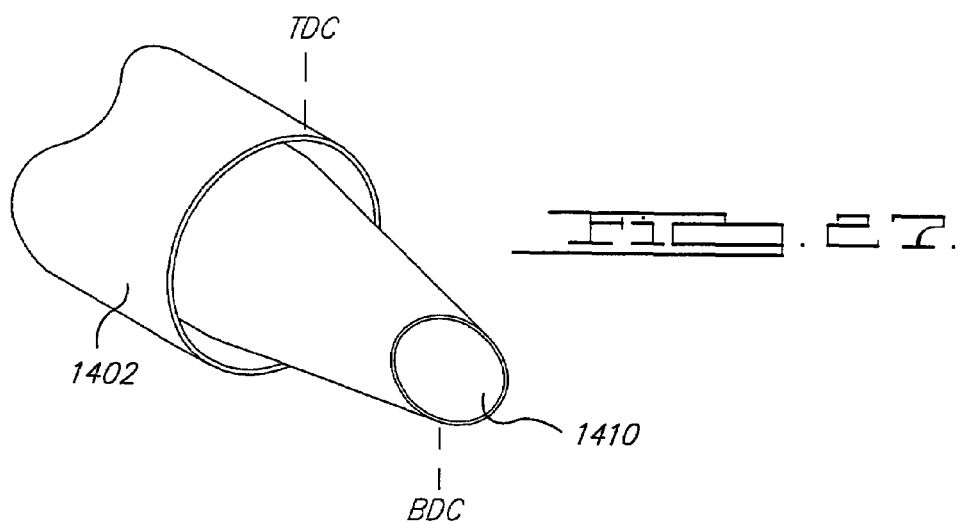
FIG. 27 is an alternative preferred form of the nozzle system shown in FIG. 26, but with the lip of the primary nozzle rotated to the 3 o'clock position in between the top dead center and bottom dead center positions.

Referring now to FIG. 26, an exhaust system 1400 in accordance with an alternative preferred embodiment of the present invention is shown. The exhaust system 1400 is also adapted specifically for use with a turbofan jet engine that provides separate fan flow and core flow streams that are not mixed. The exhaust system 1400 includes a fan nozzle 1402 and a primary nozzle 1404 extending from the fan nozzle 1402 and concentric with the fan nozzle. The primary nozzle has a length sufficient to enclose a center plug 1406. The primary nozzle 1404 includes a downstream edge 1408 that is curved in shape rather than linear. The precise shape of the curvature is determined by a specific aircraft application. In this embodiment the downstream edge 1408 forms a lip 1410 that is positioned at a bottom dead center position. Alternatively, lip 1410 could be positioned at an intermediate point in between top dead center and bottom dead center, as illustrated in FIG. 27.

Figure 28:
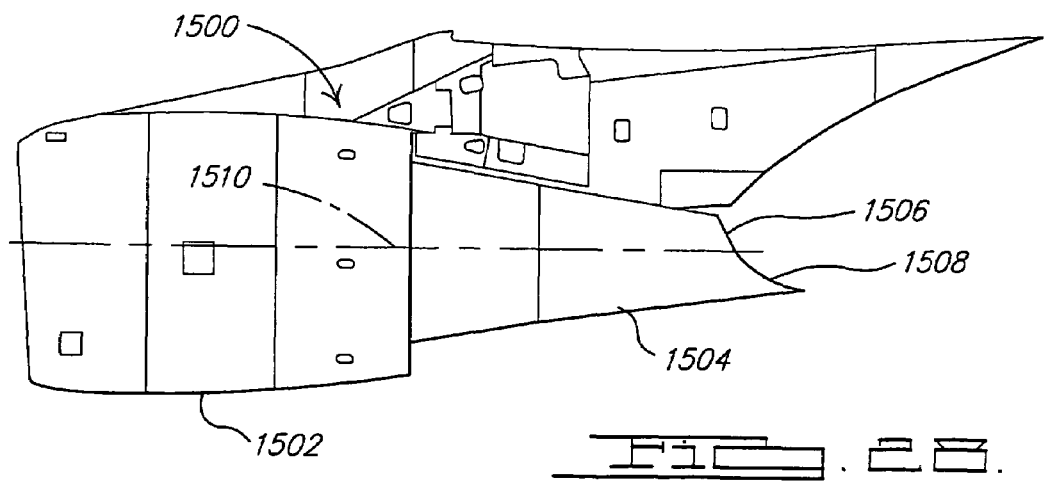
FIG. 28 is a side view of an exhaust nozzle incorporating a primary nozzle having both a beveled and a curving edge portion.

FIG. 28 illustrates an exhaust nozzle 1500 in accordance with another preferred embodiment. The nozzle 1500 includes a fan nozzle 1502 and a primary nozzle 1504. Primary nozzle 1504 includes a beveled edge 1506 and curving edge 1508 formed on opposite sides of a longitudinal center line 1510, although it will be appreciated that the precise demarcation between edge surfaces 1506 and 1508 could be formed so as to be above or below the longitudinal center line 1510.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An exhaust nozzle for a turbofan engine providing separate, non-mixed fan and core flow streams, the jet engine, comprising:
   a fan nozzle;
   a primary nozzle disposed at least partially within said fan nozzle;
   said primary nozzle having a downstream edge portion through which a core flow stream from said jet engine exits;
   said downstream edge portion forming a beveled edge comprising an angle of greater than about five degrees relative to a reference plane bisecting said downstream edge portion, the reference plane extending orthogonal to a longitudinal axis of the primary nozzle; and
   wherein the beveled edge portion is formed in part by a length of material of said primary nozzle that extends past a center plug associated with said primary nozzle, such that an entire length of said center plug is disposed within said primary nozzle.

2. The exhaust nozzle of claim 1, wherein the beveled edge comprises an angle of between about 5-45 degrees relative to the reference plane.

3. The exhaust nozzle of claim 1, wherein said downstream edge includes first and second portions, said first portion forming a plane parallel to said reference plane, and said second portion forming said beveled edge.

4. The exhaust nozzle of claim 1, wherein the beveled edge comprises an outermost edge portion, said outermost edge portion being oriented at approximately a bottom dead center position.

5. The exhaust nozzle of claim 1, wherein the beveled edge comprises an outermost edge portion, said outermost edge portion being oriented at a midpoint between oppositely arranged top dead center and bottom dead center positions on the downstream edge.

6. An exhaust system for a turbofan jet engine having separate bypass flow and core flow streams, the system comprising:
   a bypass nozzle for directing said bypass flow stream;
   a primary nozzle for directing said core flow stream, said primary nozzle having a downstream edge that is formed with a beveled edge surface, wherein the beveled edge surface is oriented to extend at a circumferential position on the downstream edge that is intermediate a top dead center position and a bottom dead center position of the primary nozzle;
   wherein the downstream edge comprises first and second portions, the first portion being arranged to form the beveled edge surface, and the second portion arranged to form an additional beveled edge surface having a bevel angle that differs from a bevel angle of the beveled edge surface; and
   a center plug disposed within said primary nozzle so as to be completely housed within said primary nozzle.

7. The exhaust system of claim 6, wherein the downstream edge comprises first and second portions, the first portion being arranged perpendicular to a longitudinal centerline of said primary nozzle, and the second portion forming said beveled edge surface, said beveled edge surface being arranged adjacent to the first portion.

8. The exhaust nozzle of claim 6, wherein the downstream edge comprises first and second portions, the first portion being arranged to form the beveled edge surface, and the second portion arranged to form an additional curved surface.

9. The exhaust system of claim 6, further comprising a center plug disposed partially within said primary nozzle to extend from said downstream edge.

10. The exhaust system of claim 9, wherein a shape of the center plug is optimized for optimum aeroacoustic performance.

11. A method for forming an exhaust system for use with a turbofan jet engine having separate, non-mixed bypass and core flows, the method comprising:
   providing a bypass nozzle;
   providing a primary nozzle concentrically within the bypass nozzle;
   disposing a center plug adjacent with said primary nozzle;
   providing the primary nozzle with a downstream edge that is beveled relative to a longitudinal centerline of the primary nozzle; and
   further providing the primary nozzle such that an angle of said beveled downstream edge is greater than approximately 5 degrees, and such that an entire length of said center plug is disposed within said primary nozzle.

12. An exhaust nozzle for a turbofan engine providing separate, non-mixed fan and core flow streams, the jet engine, comprising:
   a fan nozzle;
   a primary nozzle disposed at least partially within said fan nozzle;
   said primary nozzle having a downstream edge portion through which a core flow stream from said jet engine exits;
   said downstream edge portion forming a beveled edge comprising an angle of greater than about five degrees relative to a reference plane bisecting said downstream edge portion, the reference plane extending orthogonal to a longitudinal axis of the primary nozzle; and
   wherein the beveled edge portion is formed in part by a length of material of said primary nozzle that extends past a center plug associated with said primary nozzle such that an entire length of said center plug is disposed within said primary nozzle; and
   wherein the beveled edge portion is formed in part by a length of material of said primary nozzle that is optimized for aeroacoustic performance.

* * * * *